US010890388B2

(12) United States Patent
Konopacki et al.

(10) Patent No.: US 10,890,388 B2
(45) Date of Patent: Jan. 12, 2021

(54) SYSTEM AND METHOD FOR ADDITIVELY MANUFACTURING BOILER TUBES

(71) Applicant: GENERAL ELECTRIC TECHNOLOGY GMBH, Baden (CH)

(72) Inventors: Ronald Francis Konopacki, Suffield, CT (US); Philip Frederick Gilston, Burlington, CT (US); Xiaoling Li, Simsbury, CT (US)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 374 days.

(21) Appl. No.: 15/331,046

(22) Filed: Oct. 21, 2016

(65) Prior Publication Data

US 2018/0112936 A1 Apr. 26, 2018

(51) Int. Cl.
| | | |
|---|---|---|
| *B23K 11/00* | (2006.01) | |
| *B33Y 10/00* | (2015.01) | |
| *B23K 10/02* | (2006.01) | |
| *F28F 13/18* | (2006.01) | |
| *B33Y 30/00* | (2015.01) | |
| *B21C 37/15* | (2006.01) | |
| *B23K 25/00* | (2006.01) | |

(Continued)

(52) U.S. Cl.
CPC ............ *F28F 13/18* (2013.01); *B21C 37/154* (2013.01); *B21D 53/06* (2013.01); *B23K 9/048* (2013.01); *B23K 10/027* (2013.01); *B23K 11/0013* (2013.01); *B23K 25/005* (2013.01); *B23P 15/26* (2013.01); *B33Y 10/00* (2014.12); *B33Y 30/00* (2014.12); *B33Y 80/00* (2014.12); *F28F 1/10* (2013.01); *B23K 2101/06* (2018.08)

(58) Field of Classification Search
CPC .......... F28F 13/18; F28F 1/10; B23K 10/027; B23K 25/005; B23K 11/0013; B23K 9/048; B23K 2101/06; B33Y 10/00; B33Y 80/00; B33Y 30/00; B21C 37/154; B23P 15/26; B21D 53/06
See application file for complete search history.

(56) References Cited

U.S. PATENT DOCUMENTS

| | | | |
|---|---|---|---|
| 3,259,975 A | 7/1966 | Chapman | |
| 3,862,489 A * | 1/1975 | Weisinger | B21C 37/06 228/143 |

(Continued)

FOREIGN PATENT DOCUMENTS

| | | |
|---|---|---|
| DE | 1 933 799 A1 | 1/1971 |
| DE | 2 445 891 A1 | 4/1976 |

(Continued)

OTHER PUBLICATIONS

International Search Report and Opinion issued in connection with corresponding PCT Application No. PCT/EP2017/076742 dated Jan. 24, 2018.

*Primary Examiner* — Lawrence Averick
(74) *Attorney, Agent, or Firm* — Grogan, Tuccillo & Vanderleeden, LLP (57) ABSTRACT

A method of manufacturing a tube is provided. The method includes: selecting a core pipe having a thickness that is initially less than a desired thickness of the tube; and building-up an outer layer over an exterior surface of the core pipe via additive manufacturing so as to increase the thickness of the core pipe such that the thickness of the core pipe is equal to the desired thickness of the tube.

12 Claims, 8 Drawing Sheets

(51) Int. Cl.
*B33Y 80/00* (2015.01)
*B23K 9/04* (2006.01)
*B21D 53/06* (2006.01)
*B23P 15/26* (2006.01)
*F28F 1/10* (2006.01)
*B23K 101/06* (2006.01)

(56) References Cited

U.S. PATENT DOCUMENTS

| | | | |
|---|---|---|---|
| 4,075,376 A | 2/1978 | Jaeger | |
| 4,585,917 A * | 4/1986 | Yoshida | B23K 9/048 219/59.1 |
| 4,698,483 A * | 10/1987 | Marinoni | B25J 19/0037 219/121.78 |
| 5,584,428 A * | 12/1996 | Satoh | B21C 37/06 228/194 |
| 2013/0310961 A1 | 11/2013 | Intriago Velez | |
| 2015/0343565 A1* | 12/2015 | Andre | B23K 9/048 29/416 |
| 2016/0053922 A1* | 2/2016 | Ehsani | B29C 63/10 138/141 |
| 2017/0072494 A1* | 3/2017 | Akamatsu | B23K 9/167 |
| 2018/0101943 A1 | 4/2018 | Konopacki et al. | |
| 2018/0111708 A1 | 4/2018 | Konopacki et al. | |
| 2018/0117661 A1 | 5/2018 | Konopacki | |

FOREIGN PATENT DOCUMENTS

| | | |
|---|---|---|
| EP | 2 837 445 A1 | 2/2015 |
| EP | 205342165 U | 6/2016 |
| JP | S50-66454 A | 6/1975 |
| JP | S58-68470 A | 4/1983 |
| WO | 2015/136903 A1 | 9/2015 |

* cited by examiner

SYSTEM AND METHOD FOR ADDITIVELY MANUFACTURING BOILER TUBES

BACKGROUND

Technical Field

Embodiments of the invention relate generally to the manufacturing of tubes and pipes, and more specifically, to a system and method for additively manufacturing a tube or pipe for a boiler.

Discussion of Art

Many power generation plants utilize steam generators to power turbines which generate electrical power. Such power plants typically use boilers to generate steam via header assemblies which include a plurality of riser pipes or tubes fluidly connected to a drum pipe, collectively referred to herein as "header pipes," "header piping," "pipes," and "piping." Generally, a boiler generates steam by filling the drum pipe of a header assembly with water and exposing the header assembly to a hot flue gas generated by combusting a fuel. In turn the water absorbs thermal energy from the flue gas and rises within the riser pipes as steam.

Presently, many header pipes/tubes are made from seamless tubes manufactured by certified vendors which are often remotely located from the manufacturing site of the header assembly. Many such vendors, however, are unable to keep up with the increasing demand for seamless tubes and require long lead times to fulfill orders. For example, many vendors require a lead time of six (6) months or more. Thus, the procurement period for header tubes is often a major factor in the length of time it takes to build a header assembly and/or a boiler.

Moreover, many vendors only manufacture tubing in a limited number of sizes and/or shapes. Thus, manufacturers of header assemblies are often forced to buy more tubing than is required for a particular header assembly design if the design requires a tube or pipe length longer than the longest length available from a vendor.

Additionally, many header tubes have fittings, e.g., nozzles, nipples, tees, etc. Presently, such fittings are forged and then connected to the header tubes. However, because forging is often a resource intensive process, many vendors often only forge fittings in a limited number of sizes and/or shapes.

What is needed, therefore, is an improved system and method for additively manufacturing a tube or pipe.

BRIEF DESCRIPTION

In an embodiment, a method of manufacturing a tube is provided. The method includes: selecting a core pipe having a thickness that is initially less than a desired thickness of the tube; and building-up an outer layer over an exterior surface of the core pipe via additive manufacturing so as to increase the thickness of the core pipe such that the thickness of the core pipe is equal to the desired thickness of the tube.

In another embodiment, a system for additively manufacturing a tube is provided. The system includes a mount and a welding torch. The mount secures a core pipe having a thickness that is initially less than a desired thickness of the tube. The welding torch is disposed on a mobile arm configured to move the welding torch along the secured core pipe. When the core pipe is secured to the mount, the welding torch builds-up an outer layer over an exterior surface of the core pipe so as to increase the thickness of the core pipe such that the thickness of the core pipe is equal to the desired thickness of the tube.

In yet another embodiment, a tube is provided. The tube includes a core pipe having an exterior surface. An additively manufactured outer layer is disposed over the exterior surface.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. The term "real-time," as used herein, means a level of processing responsiveness that a user senses as sufficiently immediate or that enables the processor to keep up with an external process. As used herein, "electrically coupled," "electrically connected," and "electrical communication" mean that the referenced elements are directly or indirectly connected such that an electrical current, or other communication medium, may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid and/or gas flowing between and/or near the referenced elements. As also used herein, the term "heating contact" means that the referenced objects are in proximity of one another such that heat/thermal energy can transfer between them. Further, the terms "additively manufactured," and "additive manufacturing," as used herein, refer to the joining of materials to make objects based at least in part on a three dimensional ("3D") model, typically layer upon layer, e.g., 3D printing.

Additionally, while the embodiments disclosed herein are primarily described with respect to header tubes, it is to be understood that embodiments of the present invention may be applicable to any type of manufactured tube, e.g., piping used for oil, gas, and/or water pipelines.

Figure 1:
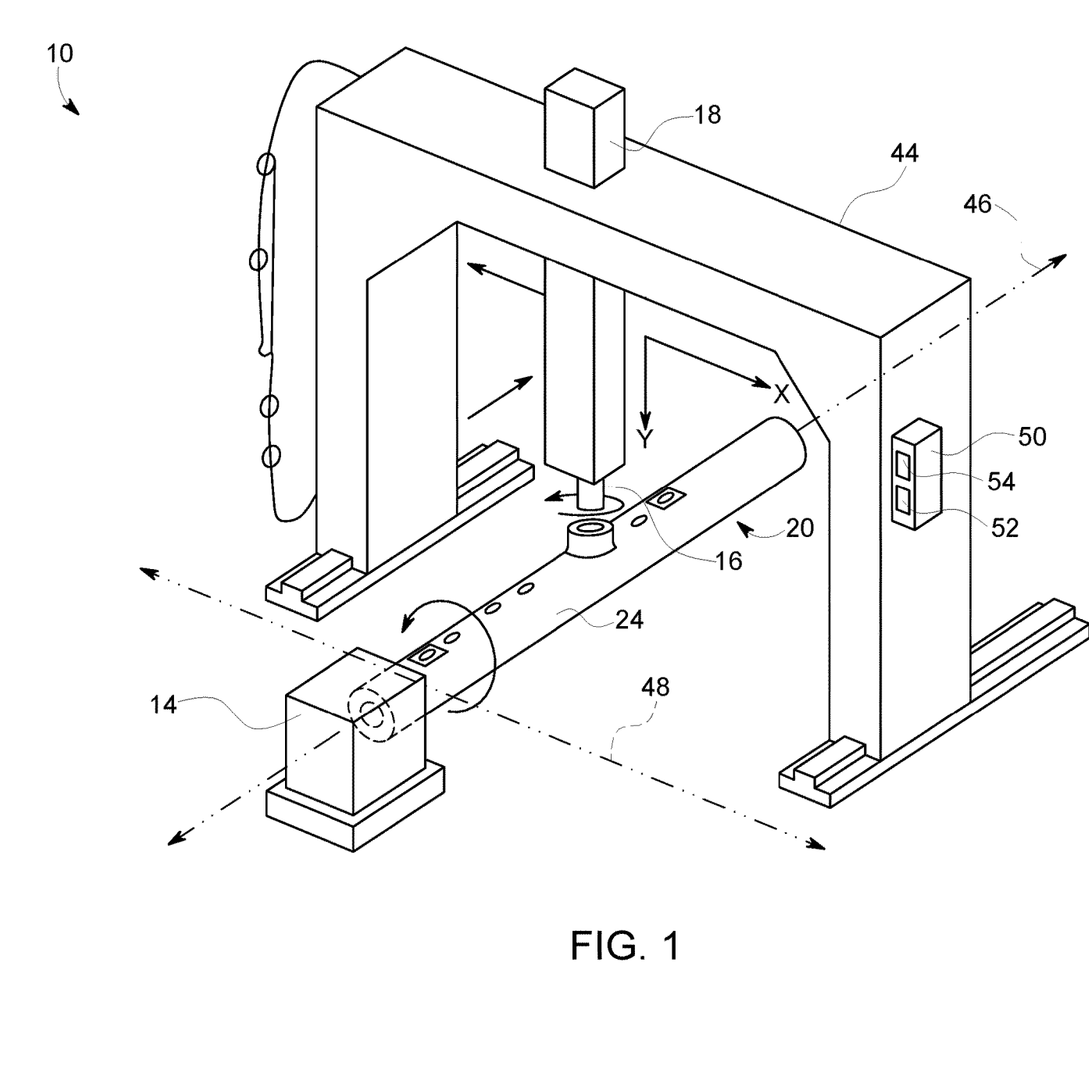
FIG. 1 is a perspective view of a system for additively manufacturing a tube in accordance with an embodiment of the present invention.
Figure 2:
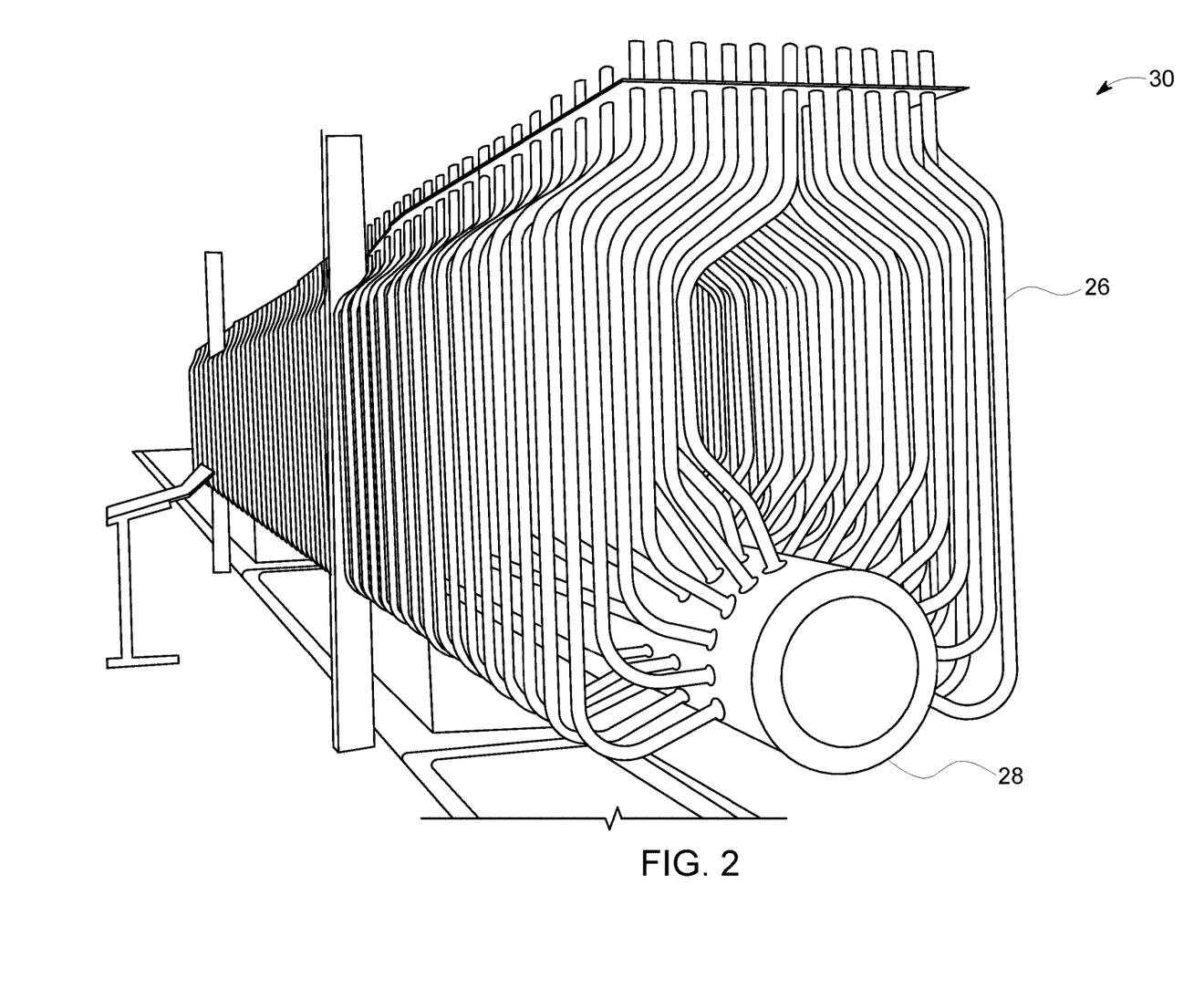
FIG. 2 is a perspective view of a header assembly that includes tube made utilizing the system of FIG. 1 in accordance with an embodiment of the present invention.

Referring now to FIG. 1, the components of a system 10 for additively manufacturing a tube 12 (best seen in FIGS. 4 and 8) are shown. The system 10 includes a mount 14 and a welding torch 16 disposed on a mobile arm 18. The mount 14 secures a core pipe 20 that has a thickness that is less than a desired thickness of the tube 12. When the core pipe 20 is secured to the mount 14, the welding torch 16 builds-up an outer layer 22 (best seen in FIGS. 4 and 7) over an exterior surface 24 so as to increase the thickness of the core pipe 20 such that the thickness of the core pipe 20 is equal to the desired thickness of the tube 12. The terms "buildup," "build-up", "building-up," "built-up," and "builds-up," as used herein with respect to the outer layer 22, mean disposing/applying the outer layer 22 over the exterior surface 24 of the core pipe 20 in a progressive manner, e.g., the outer layer 22 may increase in size/thickness with every rotation of the core pipe 20. As will be appreciated, and as shown in FIG. 2, the tube 12 may be riser tube 26 or a drum pipe 28 in a boiler header assembly 30.

Figure 3:
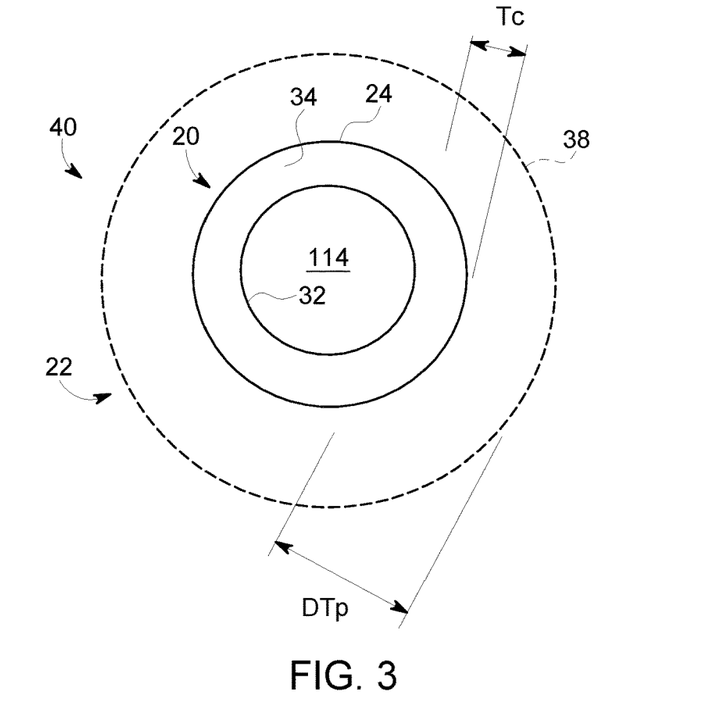
FIG. 3 is a schematic diagram of a core pipe utilized by the system of FIG. 1 in accordance with an embodiment of the present invention.
Figure 4:
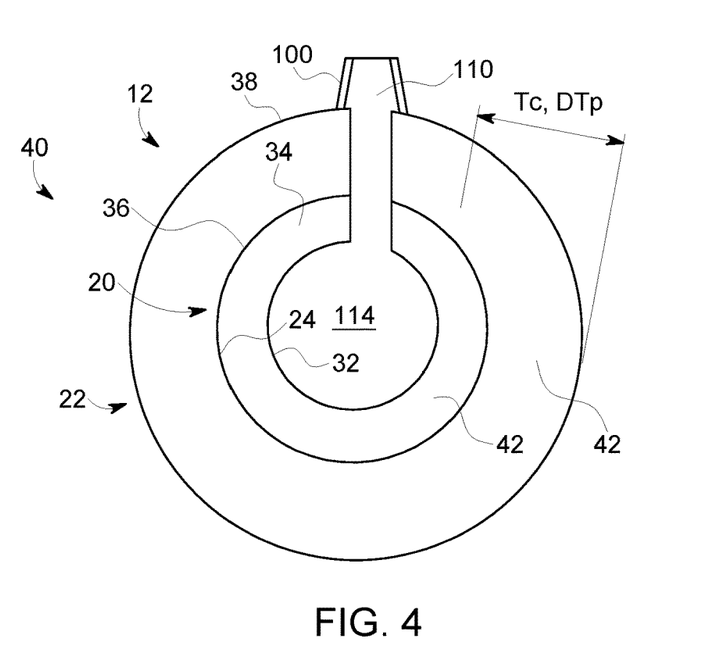
FIG. 4 is a schematic diagram of the tube additively manufactured by the system of FIG. 1 in accordance with an embodiment of the present invention.

Turning now to FIGS. 3 and 4, the core pipe 20 is shown without the outer layer (indicated in FIG. 3 by the dashed circle 22) and with the outer layer (indicated in FIG. 4 by the solid circle 22). As can be seen in FIG. 3, the core pipe 20 includes an interior surface 32 opposite the exterior surface 24, and in some embodiments, may be made from seamless piping. Thus, as used herein, the "wall" of the core pipe 20 refers to the area 34 between the interior surface 32 and the exterior surface 24. As best seen in FIG. 4, the outer layer 22, which as stated above is built-up over the exterior surface 24 of the core pipe 20, also includes an interior surface/boundary 36 and an exterior surface 38. As will be appreciated, the interior surface/boundary 36 of the outer layer 22 is the region where the core pipe 20 initially stops and the outer layer 22 begins. Accordingly, as used herein, the "thickness" of the core pipe 20, depicted as the line labeled $T_c$ in FIGS. 3 and 4, refers to the distance between the interior surface 32 and the start of the atmosphere 40 surrounding the exterior surface 24 of the core pipe 20 prior to buildup of the outer layer 22, or to the atmosphere 40 surrounding the exterior surface 38 of the outer layer 22 when the outer layer 22 has been built-up over the exterior layer 24 of the core pipe 20. In other worlds, the thickness $T_c$ of the core pipe 20 is initially the distance between the interior 32 and exterior 24 surfaces of the core pipe 20, and is increased by building-up the outer layer 22 over the exterior surface 24 of the core pipe 20.

As also shown in FIG. 4, the tube 12 includes both the core pipe 20 and the outer layer 22. In other words, the core pipe 20 serves as the foundation of the tube 12. Thus, the interior surface 32 of the core pipe 20 is the interior surface 32 of the tube 12, the exterior surface 38 of the outer layer 22 is the exterior surface 38 of the tube 12, and, as used herein, the "wall" of the tube 12 refers to the area 42 between the interior surface 32 and the exterior surface 38. Accordingly, as also used herein, the "thickness," of the tube 12, refers to the distance between the interior surface 32 and the exterior surface 38. Thus, as further used herein, the "desired thickness" of the tube 12, depicted as the dashed distance line $DT_p$ in FIG. 3 and as the solid distance line $DT_p$ in FIG. 4, refers to a desired distance/thickness between the interior surface 32 and the exterior surface 38 of the tube 12. Thus, as is to be appreciated, the core pipe 20 becomes the tube 12 when the outer layer 22 has been built-up such that the thickness $T_c$ of the core pipe 20 equals the desired thickness $DT_p$ of the tube 12.

Referring back to FIG. 1, the system, 10 may further include a gantry 44 to which the mobile arm 18 is mounted to. In such embodiments, the gantry 44 may move along a longitudinal axis/length 46 of the core pipe 20, and/or provide for the mobile arm 18 to move along a lateral axis/width 48 of the core pipe 20, such that the welding torch 16 disposed on the mobile arm 18 is able to build-up the outer layer 22 over all, or a substantial portion, of the exterior surface 24 of the core pipe 20. For example, in embodiments, the gantry 44 may move along the length of the core pipe 20 via wheels and/or tracks and the mobile arm 18 may move along the width of the core pipe 20 via wheels and/or a gear track.

As will also be appreciated, the mobile arm 18 may be configured to accommodate a variety of tools, e.g., the torch 16, saws, drills, and/or other devices appropriate for manufacturing tubes 12. For example, in embodiments, the mobile arm 18 may be configured to include a variety of different torches for different welding methods.

In embodiments, the system 10 may also include a controller 50 that includes at least one processor 52 and a memory device 54.

Figure 5:
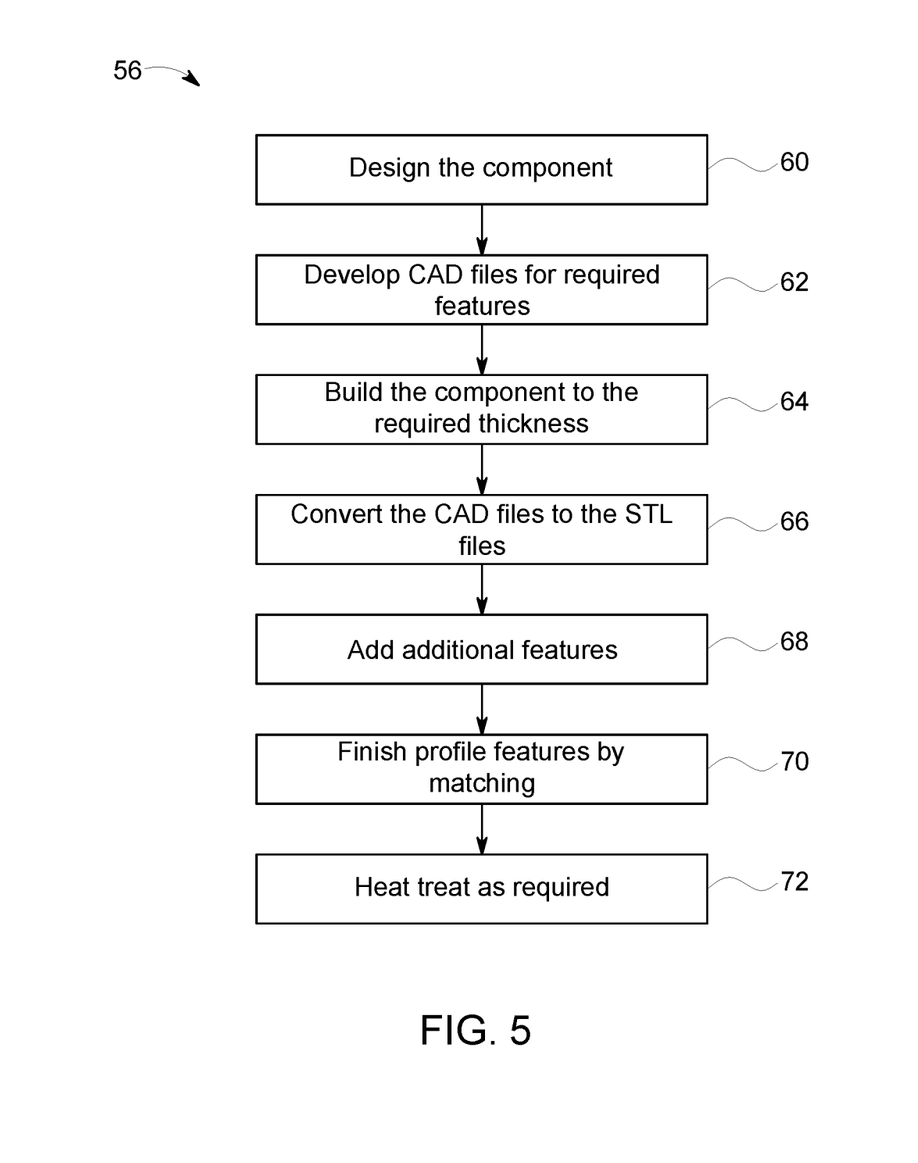
FIG. 5 is a flow chart depicting a method of additively manufacturing the tube utilizing the system of FIG. 1 in accordance with an embodiment of the present invention.
Figure 6:
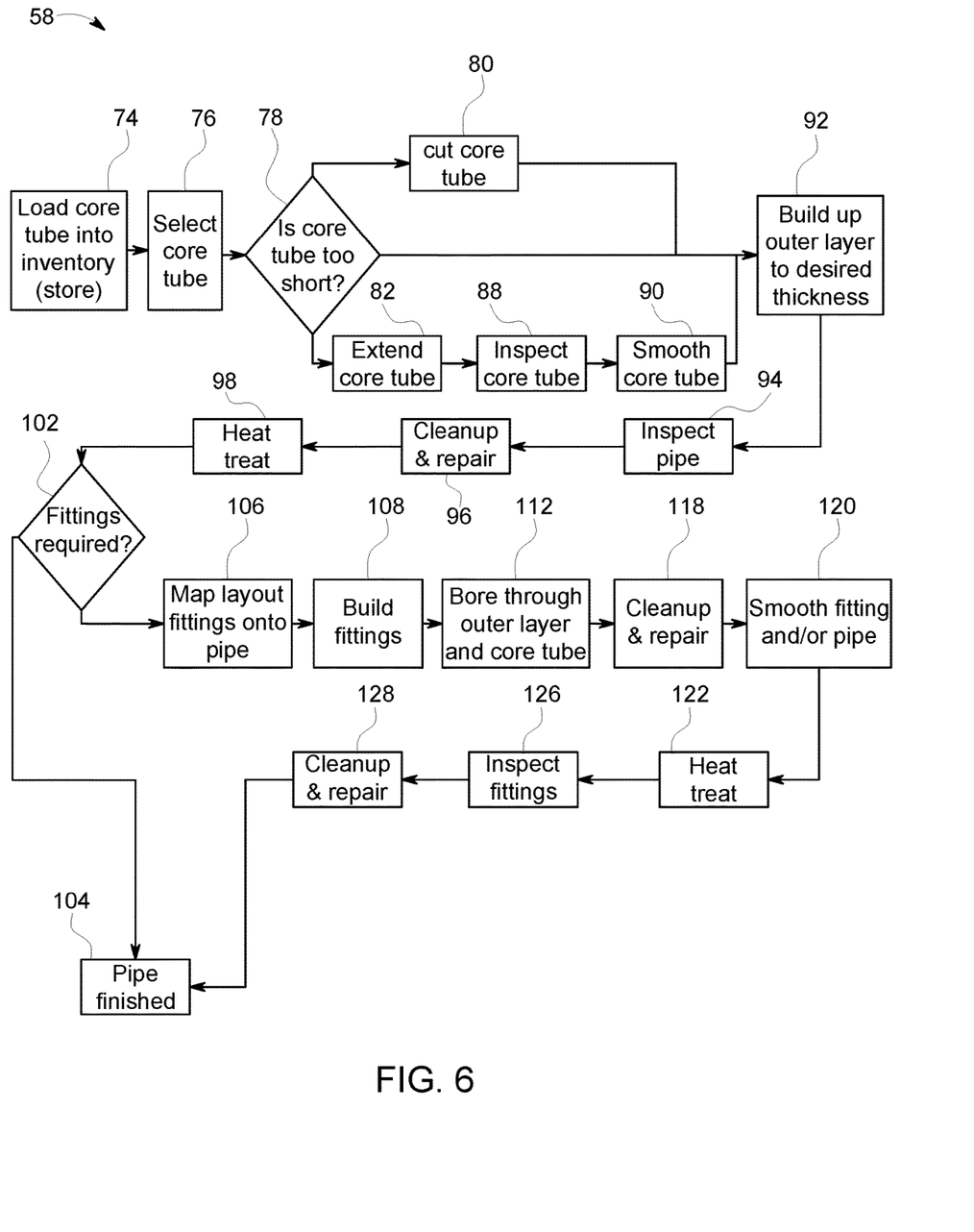
FIG. 6 is a flow chart depicting another method of additively manufacturing the tube utilizing the system of FIG. 1 in accordance with an embodiment of the present invention.

Turning now to FIGS. 5 and 6, two methods 56 and 58 of additively manufacturing a tube 12 utilizing the system 10 are shown. As will be appreciated, the methods 56 and 58 represent a high level view and a more detailed view, respectively, of processes for additively manufacturing the tube 12 in accordance with embodiments of the present invention.

Accordingly, in embodiments, the method 56 includes designing 60 a component/tube 12; developing 62 a computer aided design ("CAD") file; building 64 the designed component/tube 12; converting 66 the CAD file into a stereolithographic ("STL") file; adding 68 additional features; finishing 70 the features; and/or heat-treating 72 the component/tube 12 and/or features.

As illustrated in FIG. 6, in embodiments, the method 58 includes loading 74 one or more core pipes 20 into an inventory, i.e., storing the core pipes 20 at a facility such as the manufacturing site of the tube 12, e.g., the location where the system 10 is located. As will be appreciated, in embodiments, a large variety of core pipes 20 may be stored at the manufacturing site. For example, the inventory at the manufacturing site may include core pipes 20 having one or more of the characteristic set forth in table 1 (shown below) wherein: "Circ #" indicates the industry standard circumference number of the tubing/piping forming the core pipe 20; "name/type" indicates the common industry name for the type of tubing/piping of the core pipe 20; "OD," "Thk," and "ID" indicate the outer diameter, thickness $T_c$, and inner diameter of the core pipe 20, and "Material" indicates the substance/material that the core pipe 20 is made from.

As illustrated in FIG. 6, in embodiments, the method 58 includes loading 74 one or more core pipes 20 into an inventory, i.e., storing the core pipes 20 at a facility such as the manufacturing site of the tube 12, e.g., the location where the system 10 is located. As will be appreciated, in embodiments, a large variety of core pipes 20 may be stored at the manufacturing site. For example, the inventory at the manufacturing site may include core pipes 20 having one or more of the characteristic set forth in table 1 (shown below) wherein: "Circ #" indicates the industry standard circumference number of the tubing/piping forming the core pipe 20; "name/type" indicates the common industry name for the type of tubing/piping of the core pipe 20; "OD," "Thk," and "ID" indicate the outer diameter, thickness $T_c$, and inner diameter of the core pipe 20, and "Material" indicates the substance/material that the core pipe 20 is made from.

embodiments, the core pipe 20 may be selected based on the desired size/amount of the outer layer 22 to be built-up over the exterior surface 24 of the core pipe 20. Further, it is also to be appreciated that the core pipe 20 may be selected based other factors in addition to its initial thickness, e.g., the strength of the material that the core pipe 20 is made from, the corrosion and/or erosion resistance of the material that the core pipe 20 is made from, and/or the cost of the core pipe 20. For example, in embodiments, the core pipe 20 may be selected such that its material is appropriate for the medium intended to be transported via the finished manufactured tube 12. In embodiments, the core pipe 20 may be made of carbon or low allow steels, e.g, carbon molybdenum, and/or chromium molybdenum steel.

Once selected 76, the core pipe 20 is evaluated to determine 78 if the length of the core pipe 20 is sufficient, too long, or too short with respect to the desired length of the manufactured tube 12. If the length of the core pipe 20 is sufficient, i.e., the length of the core pipe 20 is the same as the desired length of the tube 12, then the outer layer 22 may be built-up over the exterior surface 24 of the core pipe 20. If the length of the core pipe 20 is longer than the desired length of the tube 12, then the core pipe 20 may be cut 80. If the length of the core pipe 20 is shorter than the desired length of the tube 12, then the length of the core pipe 20 may be extended 82.

TABLE 1

| Circ # | Name/type | OD (mm) | Thk (mm) | ID (mm) | Material | Pipe Size DN | Schedule | Thk (mm) | ID mm |
|---|---|---|---|---|---|---|---|---|---|
| E-07 | ECON JUNCTION HEADER | 273 | 65 | 143 | SA 106C | — | — | — | — |
| S-02 | SH FURN ROOF INLET HEADER | 323.9 | 70 | 183.9 | SA 335 P12 | 200 | 60 | 10.31 | 198.50 |
| S-26 | SH DIV PANEL INLET HEADER | 323.9 | 70 | 183.9 | SA 335 P12 | 200 | 60 | 10.31 | 198.50 |
| F-01 | FURN LWR FRONT INLET HEADER | 323.9 | 65 | 193.9 | SA-106C | 200 | 60 | 10.31 | 198.50 |
| F-07 | FURN LWR REAR INLET HEADER | 323.9 | 65 | 193.9 | SA-106C | 200 | 60 | 10.31 | 198.50 |
| F-16 | FURN LWR SIDE INLET HEADER | 323.9 | 65 | 193.9 | SA-106C | 200 | 60 | 10.31 | 198.50 |
| F-05 | FURN UPP FRONT OUTLET HEADER | 355.6 | 80 | 195.6 | SA-335 P12 | 200 | 60 | 10.31 | 198.50 |
| F-14 | FURN UPP REAR OUTLET HEADER | 355.6 | 80 | 195.6 | SA-335 P12 | 200 | 60 | 10.31 | 198.50 |
| F-20 | FURN UPP SIDE OUTLET HEADER | 355.6 | 80 | 195.6 | SA-335 P12 | 200 | 60 | 10.31 | 198.50 |
| S-22 | BP FRONT OUTLET HEADER | 406.4 | 105 | 196.4 | SA 335 P12 | 200 | 60 | 10.31 | 198.50 |
| S-06 | BP EXT SIDE INLET HEADER | 355.6 | 75 | 205.6 | SA 335 P12 | 250 | 80S | 12.70 | 247.60 |
| S-11 | BP UPP SIDE HEADER | 355.6 | 75 | 205.6 | SA 335 P12 | 250 | 80S | 12.70 | 247.60 |
| S-32 | SH PLATEN INLET HEADER | 355.6 | 70 | 215.6 | SA 335 P12 | 250 | 80S | 12.70 | 247.60 |
| S-13 | BP LWR SIDE HEADER | 406.4 | 85 | 236.4 | SA 335 P12 | 250 | 80S | 12.70 | 247.60 |
| S-14 | BP LWR FRONT HEADER | 406.4 | 85 | 236.4 | SA 335 P12 | 250 | 80S | 12.70 | 247.60 |
| S-17 | BP LWR REAR HEADER | 406.4 | 85 | 236.4 | SA 335 P12 | 250 | 80S | 12.70 | 247.60 |
| S-28 | SH DIV PANEL OUTLET HEADER | 406.4 | 85 | 236.4 | SA 335 P12 | 250 | 80S | 12.70 | 247.60 |
| S-41 | SH OUTLET HEADER | 457 | 105 | 247 | SA 335 P92 | 250 | 80S | 12.70 | 247.60 |
| S-38 | FINISH SH INLET HEADER | 406.4 | 70 | 266.4 | SA 335 P91 | 400 | 80 | 21.44 | 363.50 |
| S-25A | LINK FROM BP FRT OUT HEADER | 406.4 | 65 | 276.4 | SA 335 P12 | 400 | 80 | 21.44 | 363.50 |
| S-34 | SH PLATEN OUTLET HEADER | 457 | 75 | 307 | SA 335 P91 | 400 | 80 | 21.44 | 363.50 |
| S-09 | BP EXT SIDE FLOOR OUT HEADER | 508 | 95 | 318 | SA 335 P91 | 400 | 80 | 21.44 | 363.50 |
| S-05 | SH FURN ROOF OUTLET HEADER | 559 | 120 | 319 | SA 335 P22 | 400 | 80 | 21.44 | 363.50 |
| E-05 | ECON INLET HEADER | 559 | 105 | 349 | SA 106C | 400 | 80 | 21.44 | 363.50 |
| E-09 | ECON OUTLET HEADER | 610 | 125 | 360 | SA 106C | 400 | 80 | 21.44 | 363.50 |

As will be appreciated, in embodiments, the core pipes 20 may be ordered from a vendor at regular and/or staggered intervals, thus ensuring that a steady supply of core pipes 20 is maintained within the inventory.

Accordingly, after loading 74 the inventory with core pipes 20, a core pipe 20 having a thickness $T_c$ that is initially less/smaller than a desired thickness $DT_p$ of the tube 12 to be manufactured is selected 76 from the available inventory. While the core pipe 20 may be selected from the available core pipes 20 based on having the closest matching initial thickness to the desired thickness of the tube 12 (that does not exceed the desired thickness), it is to be appreciated that, in some embodiments, the selected core pipe 20 may not have the closest matching initial thickness. As such, in some Cutting 80 the core pipe 20 may be accomplished via a saw attached to the mobile arm 18. In other embodiments, cutting 80 of the core pipe 20 may be accomplished by a saw not attached to the mobile arm 18, e.g., a manually operated saw.

Figure 7:
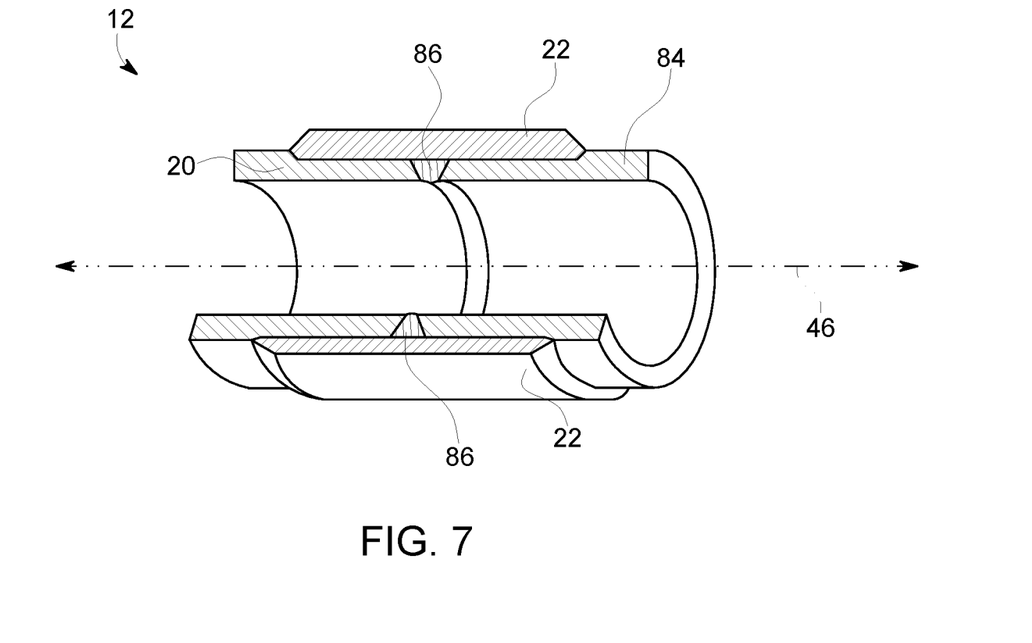
FIG. 7 is a perspective view of one or more core pipes utilized by the system of FIG. 1 in accordance with an embodiment of the present invention.

As shown in FIG. 7, extending 82 the length the core pipe 20 may include connecting the core pipe 20 to another core pipe 84. For example, in embodiments, the core pipe 20 may be but welded 86 to the core pipe 84. As will be understood, core pipes 20 having an initial thickness less-than-or-equal-to 1" may not require preparation of the but welding 86 site, whereas the but weld 86 sites of core pipes 20 having an initial thickness greater-than 1" may be prepared by cutting and beveling via an oxi-gas process and/or applying a small amount of dressing. In some embodiments, only one of the core pipes 20 or 84 may need to be prepared prior to welding by utilizing a modified vee against a straight cut.

As will be appreciated, in embodiments, the core pipe 84 may be cut/precut prior to being connected to the core pipe 20 such that the extended length of the core pipe 20, i.e., the combined length of the connected core pipes 20 and 84, is equal to the desired length of the tube 12. In embodiments, the core pipes 20 and/or 84 may be cut after being connected to each other.

As further shown in FIG. 6, after the core pipe 20 has been extended 82, the core pipe 20 may then be inspected 88 via non-destructive examination ("NDE"), e.g., phased array ultrasonic inspection, digital x-raying, magnetic particles, and/or eddy currents.

The core pipe 20 may then be smoothed 90 so as to grind down any weld flush crowns and/or otherwise prepare the exterior surface 24 to receive the outer layer 22.

Next, the outer layer 22 is built-up 92 over the exterior surface 24. For example, in embodiments, the core pipe 20 may be mounted via the mount 14, such that it is suspended within the gantry 44, thus allowing the mobile arm 18 to additively manufacture the outer layer 22 via the torch 16. In embodiments, the mount 14 may rotate the core pipe 20 along the longitudinal 46 and/or lateral 48 axes while the mobile arm 18 applies the outer layer 22 via the torch 16. As will be appreciated, in embodiments, additive manufacture of the outer layer 22 may include applying the outer layer 22 to the exterior surface 24 via gas tungsten arc welding ("GTAW"), plasma transferred arc welding ("PTAW"), gas metal arc welding ("GMAW"); submerged arc welding ("SAW"), electric resistance welding ("ERW"), electroslag welding, and/or other appropriate welding processes. As such, in embodiments, the outer layer 22 may be built-up 92 via weld strip cladding the outer layer 22 onto the exterior surface 24.

As is to be further appreciated, while, in some embodiments, the material of the outer layer 22 matches the material of the core pipe 20, in other embodiments, the material of the outer layer 22 may differ from the material of the core pipe 20, i.e., the resulting manufactured tube 12 may be bimetallic. Accordingly, the material of the outer layer 22 may be selected based on the environment the tube 12 is expected to operate in. For example, in some embodiments, wherein the exterior surface 38 of the tube 12 is expected to be exposed to corrosive chemicals, the outer layer 22 may be made from chromium. In embodiments, the core pipe 20 may be made from a carbon steel alloy having a high carbon count while the outer layer 22 may be made of a carbon steel alloy having a lower carbon count. In embodiments, the outer layer 22 may be made of: carbon steels, e.g., SA106B, SA106C; CR—Mo steels, e.g., 0.5Cr-0.5Mo, 1Cr-0.5Mo, 1.25Cr-0.5Mo—Si, 2.25Cr-1Mo. 3Cr-1Mo, 5Cr-1Mo, 9Cr-1Mo; creep strength enhanced ferritic ("CSEF") steels, e.g., 9Cr-1Mo-V (Grade 91), 9Cr-2W (Grade 92), 9Cr-3W-3Co, 2.25Cr-1.6W—V-Cb (Grade 23), 2.5Cr-1Mo—V—B—Ti (Grade 24); austenitic stainless steels, e.g., 18Cr-8Ni (TP304), 16Cr-12Ni-2Mo (TP316); and/or Nickel based alloys, e.g., 52Ni-22Cr-13Co-9Mo (Alloy 617), Ni-22Cr-14W-2Mo—La (Alloy 230), 47Ni-23-Cr-23Fe-7W (HR6W), Ni-25Cr-20Co (Alloy 740).

After build-up 92 of the outer layer 22, the core pipe 20, now a newly manufactured tube 12, may be inspected 94. Inspection 94 of the tube 12 may be accomplished via NDE and may include checking fusion bonds between the core pipe 20 and the outer layer 22 to ensure that the bonding is complete and that there are no laminations or voids.

The tube 12 may then be cleaned and repaired 96, and/or heat-treated 98. As will be appreciated, heat-treating 98 the tube 12 may temper and/or normalize the tube 12.

Figure 8:
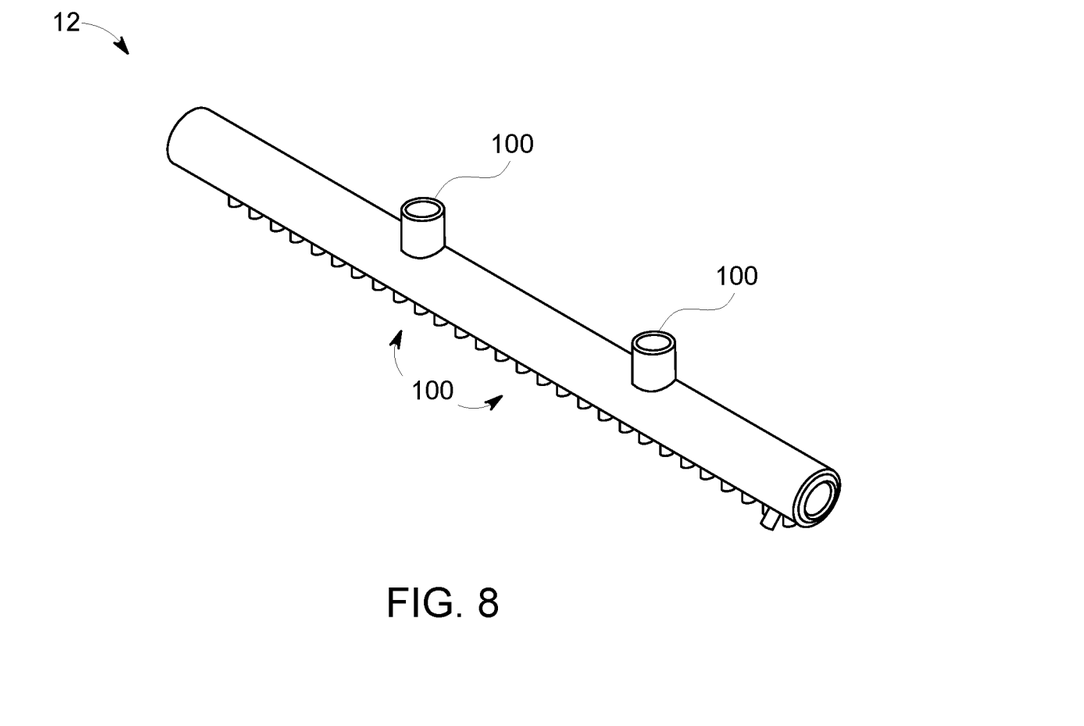
FIG. 8 is a perspective view of the tube additively manufactured by the system of FIG. 1 in accordance with an embodiment of the present invention.

As illustrated in FIG. 8, the finished tube 12 may include one or more fitting 100, e.g., nipples, nozzles, tees, weld-o-lets, elbows, a reducer, hangers and/or other types of fittings commonly used in plumbing/piping. As used herein, nipples and nozzles refer to fittings that facilitate the connection of other fittings, and/or other tubes, to the tube 12, wherein nipples have inner diameters of three inches or less (≤3") and nozzles have inner diameters greater than three inches (>3"). Further, both nipples and nozzles may include short lengths of bent tubing/piping. Thus, as also shown in FIG. 6, the method 58 may further include determining 102 whether the tube 12 is to include one or more fittings 100. If no fittings 100 are required, then the tube is finished 104. If one or more fittings 100 are required, then a layout for the one or more fittings 100 is mapped 106 to the exterior surface 38 of the tube 12.

Mapping 106 the layout for the fittings 100 to the exterior surface 38 of the tube 12 may include adapting the controller 50 such that the controller 50 is in turn able to adapt the system 10 to move the torch 16, via the mobile arm 18, to locations on the core pipe 20/tube 12 where the one or more fittings 100 are to be built. For example, in embodiments, the above referenced CAD and/or STL files may include data indicating the intended locations of the one or more fittings 100 on the tube 12 and may be used to adapt the controller 50.

Figure 9:
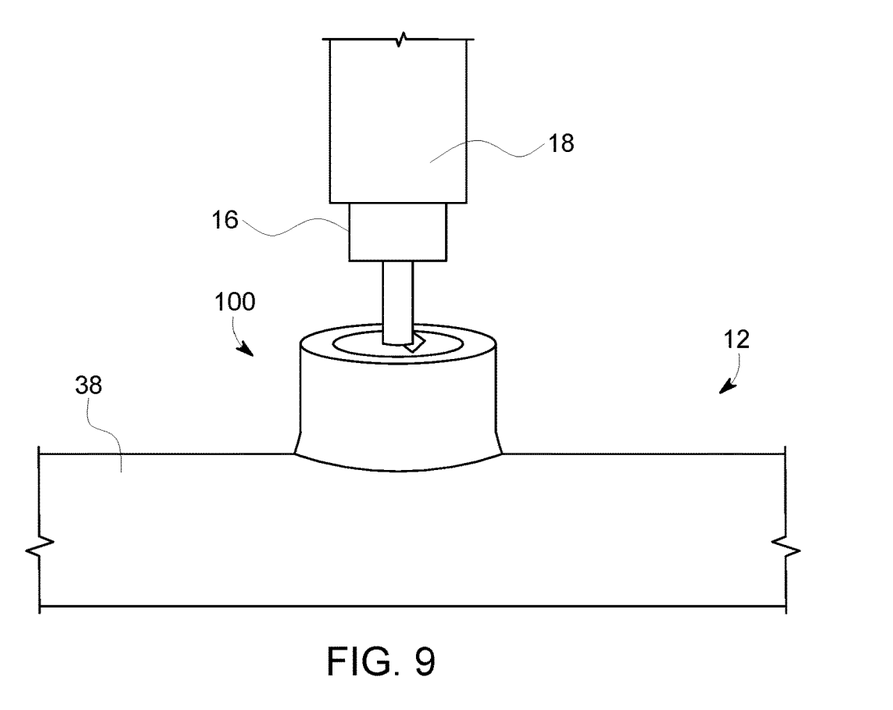
FIG. 9 is a perspective view of a fitting of the tube of FIG. 8, wherein the fitting is being additively manufactured by the system of FIG. 1 in accordance with an embodiment of the present invention.

After mapping 106 of the layout for the one or more fittings 100, the fittings 100 are then built 108 using additive manufacturing. As shown in FIG. 9, in embodiments, the fittings 100 may be additively manufactured by the mobile arm 18 via the torch 16 in a manner similar to the additive manufacture of the outer layer 22 as described above. For example, in embodiments, the mobile arm 18 may move the torch 16 over to a location of the tube 12, which according to the mapped fittings layout, may require a nozzle. The mobile arm 18 and torch 16 then builds-up the fitting 100 via welding, e.g., GTAW, PTAW, GMAW, SAW, ERW, and/or other appropriate welding processes such that the fitting 100 is disposed on, and/or otherwise incorporated into, the outer layer 22. As illustrated in FIG. 4, in embodiments, the fitting 100 may define a flow path 110, i.e, an interior cavity.

Figure 10:
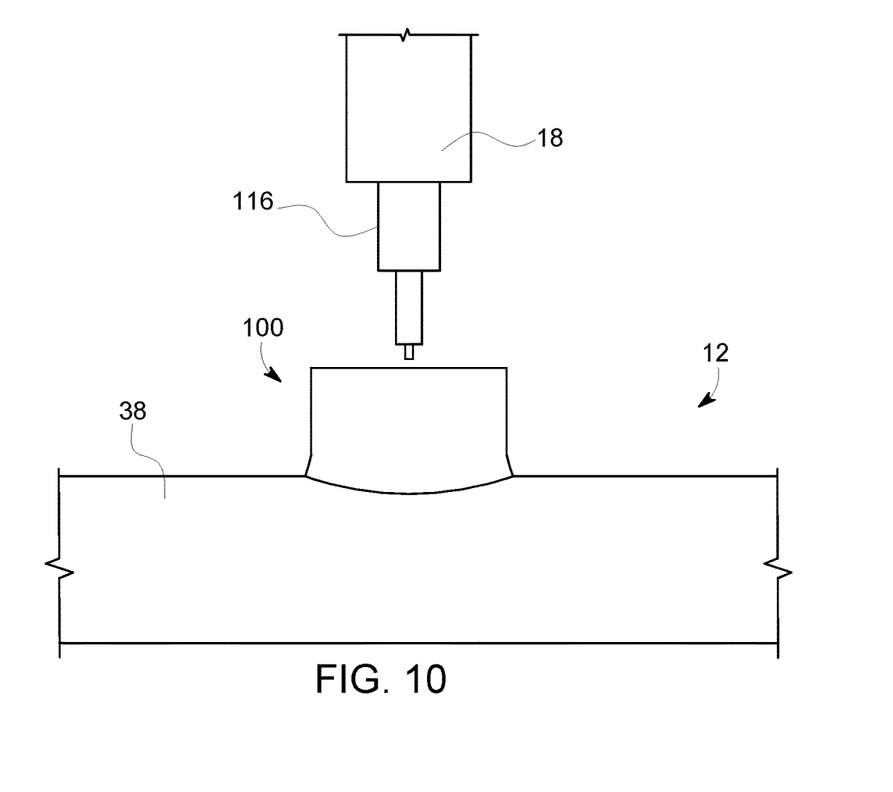
FIG. 10 is another perspective view of the fitting of the tube of FIG. 8, wherein the fitting is being bored in accordance with an embodiment of the present invention.

As shown in FIGS. 4, 6, and 10, once the fitting 100 has been built-up 108, the outer layer 22 and the core pipe 20 may then be bored/machined 112 through so as to fluidly connect the fitting 100 to an interior cavity 114 (FIG. 4) of the core pipe 20/tube 12, i.e., the flow path 110 of the fitting 100 is fluidly connected to the area 114 encompassed by the interior surface 32 of the core pipe 20/tube 12. As such, in embodiments, the system 10 may further include a boring/machining device 116, e.g., a drill, laser cutter, punch, etc, which may be disposed on the mobile arm 18.

Figure 11:
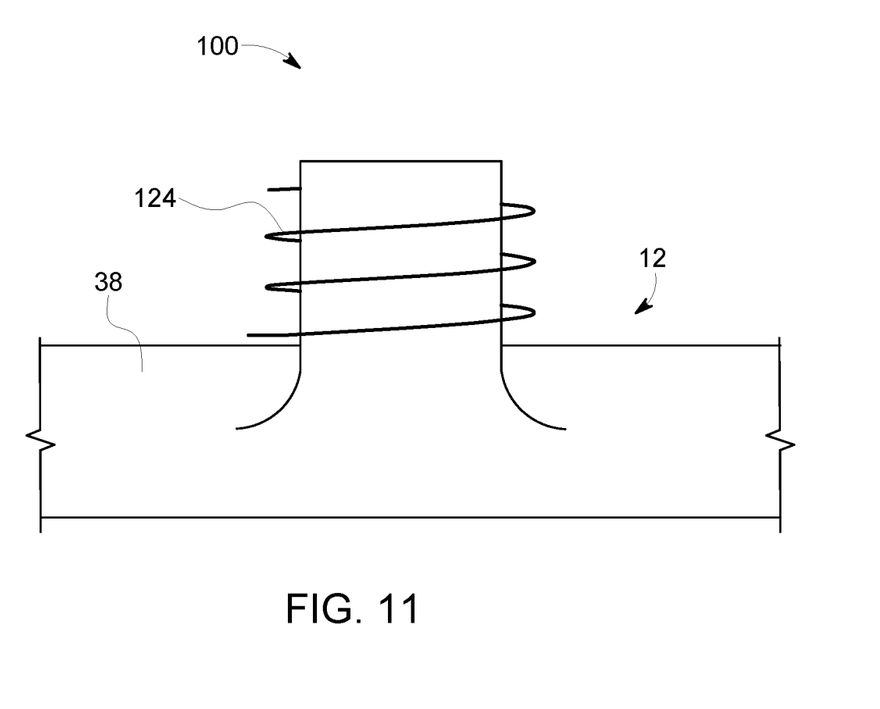
FIG. 11 is another perspective view of the fitting of the tube of FIG. 8, wherein the fitting is being heat-treated in accordance with an embodiment of the present invention.

After boring 112 the fitting 100, the fitting 100 may then be cleaned and repaired 118, smoothed 120, and/or heat-treated 122. In embodiments, heat-treating 122 of the fitting 100 may be performed via a heating coil 124 (FIG. 11) that wraps around the fitting 100.

After heat-treating 122 the fittings 100, the tube 12 and/or the fittings 100 may be inspected 126, and/or cleaned and repaired 128 prior to finishing 104 of the tube 12.

Finally, it is also to be understood that the system 10 may include the necessary electronics, software, memory, storage, databases, firmware, logic/state machines, microprocessors, communication links, displays or other visual or audio user interfaces, printing devices, and any other input/ output interfaces to perform the functions described herein and/or to achieve the results described herein. For example, as stated above, the system 10 may include at least one processor 52 and system memory/data storage structures 54 in the form of a controller 50. The memory may include random access memory ("RAM") and read-only memory ("ROM"). The at least one processor may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application, e.g., a CAD and/or 3D printing application, that provides for control over one or more of the various components of the system 10, e.g., the mount 14, the torch 16, mobile arm 18, and/or the gantry 44, may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes the at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment a method of manufacturing a tube is provided. The method includes: selecting a core pipe having a thickness that is initially less than a desired thickness of the tube; and building-up an outer layer over an exterior surface of the core pipe via additive manufacturing so as to increase the thickness of the core pipe such that the thickness of the core pipe is equal to the desired thickness of the tube. In certain embodiments, building-up an outer layer over an exterior surface of the core pipe via additive manufacturing includes weld strip cladding the outer layer onto the exterior surface of the core pipe. In certain embodiments, the core pipe includes a first material and the outer layer includes a second material different from the first material. In certain embodiments, the method further includes building fittings into the outer layer via additive manufacturing. In certain embodiments, the fittings include at least one of a nipple, a nozzle, a tee, a weld-o-let, an elbow, and a reducer. In certain embodiments, the fitting defines a flow path and the method further includes boring through the outer layer and the core pipe such that the flow path is fluidly connected to an interior cavity of the core pipe. In certain embodiments, the method further includes cutting the core pipe such that a length of the core pipe is equal to a desired length of the tube. In certain embodiments, the method further includes extending a length of the core pipe via connecting the core pipe to another core pipe such that a combined length of the connected core pipes is equal to a desired length of the tube. In certain embodiments, the method further includes storing a plurality of core pipes at a manufacturing site. In such embodiments, the core pipe is selected from the plurality of stored core pipes, and building-up an outer layer over an exterior surface of the core pipe via additive manufacturing is performed at the manufacturing site.

Other embodiments provide for a system for additively manufacturing a tube. The system includes a mount and a welding torch. The mount secures a core pipe having a thickness that is initially less than a desired thickness of the tube. The welding torch is disposed on a mobile arm configured to move the welding torch along the secured core pipe. When the core pipe is secured to the mount, the welding torch builds-up an outer layer over an exterior surface of the core pipe so as to increase the thickness of the core pipe such that the thickness of the core pipe is equal to the desired thickness of the tube. In certain embodiments, the torch builds-up the outer layer via weld strip cladding the outer layer onto the exterior surface. In certain embodiments, the mobile arm is deposed on a gantry that moves in along a length of the secured core pipe. In certain embodiments, the mount rotates the secured core pipe. In certain embodiments, the core pipe comprises a first material and the outer layer comprises a second material different from the first material. In certain embodiments, the weld torch builds a fitting into the outer layer. In certain embodiments, the fittings include at least one of a nipple, a nozzle, a tee, a weld-o-let, an elbow, and a reducer. In certain embodiments, the system further includes a drill that bores through the outer layer and the core pipe such that the fitting is fluidly connected to an interior cavity of the core pipe.

Yet still other embodiments provide for a tube. The tube includes a core pipe having an exterior surface. An additively manufactured outer layer is disposed over the exterior surface. In certain embodiments, the tube further includes an additively manufactured fitting incorporated into the outer layer. In certain embodiments, the tube is a header tube for a boiler configured to contain a pressurized heat-containing medium.

While the system 10 is depicted herein as a single manufacturing station, e.g., the gantry 44, it is to be appreciated that, in embodiments, the various process steps of the methods 56 and 58 may be distributed across multiple manufacturing stations, e.g., multiple gantries.

Further, in some embodiments of the present invention, the core pipe 20 may be chemically dissolved after the outer layer 22 has been built-up, thus leaving only the additively manufacture outer layer 22 and/or fittings 100.

Further still, it is also to be understood that tubes 12 manufactured via the system 10 and corresponding methods 56 and/or 58 may be built to satisfy industry standards for containing pressurized heat-containing mediums, e.g., steam, such as the American Society of Mechanical Engineers ("ASME") standards. As will be appreciated however, is likely that new standards will need to be implemented to account for additively manufactured fittings.

Accordingly, by utilizing additive manufacturing to thicken a core pipe, some embodiments of the present invention provide for the ability to manufacture tubes on-demand, i.e., the ability to manufacture a tube without requiring an excessive lead time between the initial request for the tube and the delivery of the tube. As such, some embodiments of the present invention provide for the on-demand manufacture of seamless tubes.

Further, because the length, materials, and/or thickness of the tube 12 can be varied, some embodiments of the present invention provide for the ability to make custom/non-standard tubes, e.g., tubes having specifications not commonly made in large numbers by vendors. Thus, such embodiments of the present invention may also reduce the cost of utilizing custom sized/shaped piping.

Further still, some embodiments, wherein the core pipes are stored at the same site that a component and/or device, e.g., a boiler header assembly, that incorporates the tube is manufactured, significantly reduce the amount of time required to manufacture such components.

Additionally, by providing for the ability to build fittings 100 onto a tube 12 via additive manufacturing, as opposed to utilizing forged fittings, some embodiments of the present invention further reduce the amount of time required to manufacture a tube 12.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method of manufacturing a tube comprising:
   selecting a core pipe having a thickness that is initially less than a desired thickness of the tube;
   building-up an outer layer over an exterior surface of the core pipe via additive manufacturing so as to increase the thickness of the core pipe, wherein the core pipe becomes the tube when the thickness of the core pipe is equal to the desired thickness; and
   building a fitting into the outer layer via additive manufacturing such that the fitting is integral with and incorporated into the outer layer, wherein the fitting includes at least one of a nipple, a nozzle, a weld-o-let, an elbow, and a reducer;
   wherein the step of building-up the outer layer includes rotating the core pipe a plurality of full revolutions so as to deposit multiple layers on a same axial location of the core pipe in a progressive manner, such that a thickness of the outer layer increases with every successive rotation of the core pipe.

2. The method of claim 1, wherein building-up an outer layer over an exterior surface of the core pipe via additive manufacturing comprises:
   weld strip cladding the outer layer onto the exterior surface of the core pipe.

3. The method of claim 1, wherein the core pipe comprises a first material and the outer layer comprises a second material different from the first material.

4. The method of claim 1 wherein the fitting defines a flow path and the method further comprises:
   boring through the outer layer and the core pipe such that the flow path is fluidly connected to an interior cavity of the core pipe.

5. The method of claim 4, wherein:
   the steps of building-up the outer layer and building a fitting into the outer layer are carried out using a torch;
   wherein the step of boring through the outer layer are carried out using a boring device;
   wherein the torch and the boring device are mountable to a common mobile arm.

6. The method of claim 1 further comprising:
   cutting the core pipe such that a length of the core pipe is equal to a desired length of the tube.

7. The method of claim 1 further comprising:
   extending a length of the core pipe via connecting the core pipe to another core pipe such that a combined length of the connected core pipes is equal to a desired length of the tube.

8. The method of claim 1 further comprising:
   storing a plurality of core pipes at a manufacturing site; and
   wherein the core pipe is selected from the plurality of stored core pipes, and building-up an outer layer over an exterior surface of the core pipe via additive manufacturing is performed at the manufacturing site.

9. A method of manufacturing a tube, comprising the steps of:
- selecting a core pipe having a thickness that is initially less than a desired thickness of the tube;
- building-up an outer layer over an exterior surface of the core pipe via additive manufacturing so as to increase the thickness of the core pipe, wherein the core pipe becomes the tube when the thickness of the core pipe is equal to the desired thickness;
- building a fitting into the outer layer via additive manufacturing such that the fitting is integral with and incorporated into the outer layer, wherein the fitting includes at least one of a nipple, a nozzle, a weld-o-let, an elbow, and a reducer; and
- heat treating the fitting by receiving only the fitting within a heating coil so that only the fitting is heat-treated.

10. The method of claim 9, further comprising the step of:
heat treating the tube, including at least the outer layer, prior to building the fitting into the outer layer, such that the step of heat treating the tube and the step of heat treating the fitting occur at different times.

11. A method of manufacturing a tube, comprising the steps of:
- selecting a core pipe having a thickness that is initially less than a desired thickness of the tube;
- building-up an outer layer over an exterior surface of the core pipe via additive manufacturing so as to increase the thickness of the core pipe, wherein the core pipe becomes the tube when the thickness of the core pipe is equal to the desired thickness; and
- building a fitting into the outer layer via additive manufacturing such that the fitting is integral with and incorporated into the outer layer, wherein the fitting includes at least one of a nipple, a nozzle, a weld-o-let, an elbow, and a reducer;
- wherein the fitting defines a flow path;
- wherein the method further includes boring through the outer layer and the core pipe such that the flow path is fluidly connected to an interior cavity of the core pipe;
- wherein the steps of building-up the outer layer and building a fitting into the outer layer are carried out using a torch;
- wherein the step of boring through the outer layer are carried out using a boring device;
- wherein the torch and the boring device are mountable to a common mobile arm; and
- wherein the method further includes cutting the core pipe to length utilizing a saw connected to the common mobile arm.

12. The method of claim 11, wherein:
the fitting includes at least one bend.

* * * * *